W. M. CORTHELL.
MACHINE FOR ATTACHING HOOKS AND EYES TO CARDS.
APPLICATION FILED JULY 31, 1907. RENEWED SEPT. 14, 1908.

904,049.

Patented Nov. 17, 1908.

Witnesses
F. L. Ourand
C. M. Catlin

Inventor
W. M. Corthell,
By Benj. R. Catlin
Attorney

W. M. CORTHELL.
MACHINE FOR ATTACHING HOOKS AND EYES TO CARDS.
APPLICATION FILED JULY 31, 1907. RENEWED SEPT. 14, 1908.

904,049.

Patented Nov. 17, 1908.

W. M. CORTHELL.
MACHINE FOR ATTACHING HOOKS AND EYES TO CARDS.
APPLICATION FILED JULY 31, 1907. RENEWED SEPT. 14, 1908.

904,049.

Patented Nov. 17, 1908.
9 SHEETS—SHEET 4.

Witnesses
F. L. Orrand
C. M. Catlin

Inventor
W. M. Corthell,
By Benj. R. Catlin
Attorney

W. M. CORTHELL.
MACHINE FOR ATTACHING HOOKS AND EYES TO CARDS.
APPLICATION FILED JULY 31, 1907. RENEWED SEPT. 14, 1908.

904,049.

Patented Nov. 17, 1908.

Witnesses
F. L. Ourand.
C. M. Catlin

Inventor
W. M. Corthell,
By Benj. R. Catlin
Attorney

W. M. CORTHELL.
MACHINE FOR ATTACHING HOOKS AND EYES TO CARDS.
APPLICATION FILED JULY 31, 1907. RENEWED SEPT. 14, 1908.

904,049.

Patented Nov. 17, 1908.

Witnesses
F. L. Ourand
C. M. Catlin

Inventor
W. M. Corthell,
By Benj. R. Catlin
Attorney

W. M. CORTHELL.
MACHINE FOR ATTACHING HOOKS AND EYES TO CARDS.
APPLICATION FILED JULY 31, 1907. RENEWED SEPT. 14, 1908.

904,049.

Patented Nov. 17, 1908.

Witnesses
F. L. Ourand.
C. M. Catlin.

Inventor
W. M. Corthell,
By Benj. R. Catlin
Attorney

UNITED STATES PATENT OFFICE.

WILLIAM M. CORTHELL, OF CHICAGO, ILLINOIS, ASSIGNOR TO F. M. WATERMAN, OF CHICAGO, ILLINOIS.

MACHINE FOR ATTACHING HOOKS AND EYES TO CARDS.

No. 904,049.     Specification of Letters Patent.     Patented Nov. 17, 1908.

Application filed July 31, 1907, Serial No. 386,485.    Renewed September 14, 1908. Serial No. 452,934.

*To all whom it may concern:*

Be it known that I, WILLIAM M. CORTHELL, a resident of Chicago, in the county of Cook and State of Illinois, have invented certain new and useful Improvements in Machines for Attaching Hooks and Eyes to Cards; and I do hereby declare the following to be a full, clear, and exact description of the invention, such as will enable others skilled in the art to which it pertains to make and use the same.

The invention relates to means for attaching hooks and eyes to cards, and has for its object to increase the certainty and efficiency of operation.

The invention consists in the construction hereinafter described and particularly pointed out.

In the accompanying drawing which froms part of the specification, Fig. 4 is a side elevation of the same; Fig. 7 is an elevation of the thread cutter and connected parts; Fig. 8 is a perspective of a holder follower; Fig. $8^x$ is a side and end elevation of a follower-carrier.

Numeral 1 denotes a rotating annular table supported upon anti-friction ball bearings 2.

3 denotes a hub fixed to the table by arms 3', and 4 denotes the capital of a hollow supporting column 5. The table is turned on the bearings 2 by a shaft 6 having at its foot a worm gear 7 driven by a worm 8 on the shaft 9, said shaft having a pulley 10 provided with a belt, not shown, connecting it to driving mechanism, not shown.

11 denotes an annular stationary bench surrounding the table and fixed upon supports 12. This bench supports a machine 13 for sewing hooks and eyes to cards in combination with devices for moving hook and eye holders together with cards into suitable relation to the sewing machine needles 14 (see Fig. 6) and for discharging them from the machine. The bed plate 91 is raised above the bench on a support $11^x$.

15 denotes a chute whereby the holders are discharged upon the table after the cards with attached hooks and eyes have been separated from them by sleeves or disks to be described.

17 is a driving pulley, 18 a friction clutch, $18^x$ a treadle and $17^x$ an intermediate rod and lever, which parts being well known need no further description.

Each hook and eye holder $80^x$ comprises a plate 81 provided with a rack or with rack teeth 29, see Figs. 14 to 18. The ends of teeth 29 are cut away as at $29^z$. To these are secured side plates 83 provided with recesses 84 to receive the shank of either hooks or eyes as desired. Opposite said recessed plate is pivotally supported a plurality of spring actuated plates 82 made by preference of sheet metal and curved at their upper ends whereby they are adapted to engage a rod 85 extended through and having bearings in projections 86.

87 denote coiled springs one end of each of which bears on the rear side of a pivoted plate 82, its opposite end bearing on a fixed abutment, preferably the rack plate, which when fixed by screw 88 or otherwise puts the spring under tension. The office of the spring is to insure continued engagement of the hooks and eyes placed in the holder.

37 denotes a holder follower and 90 a support to which it is pivoted.

Figure 1:
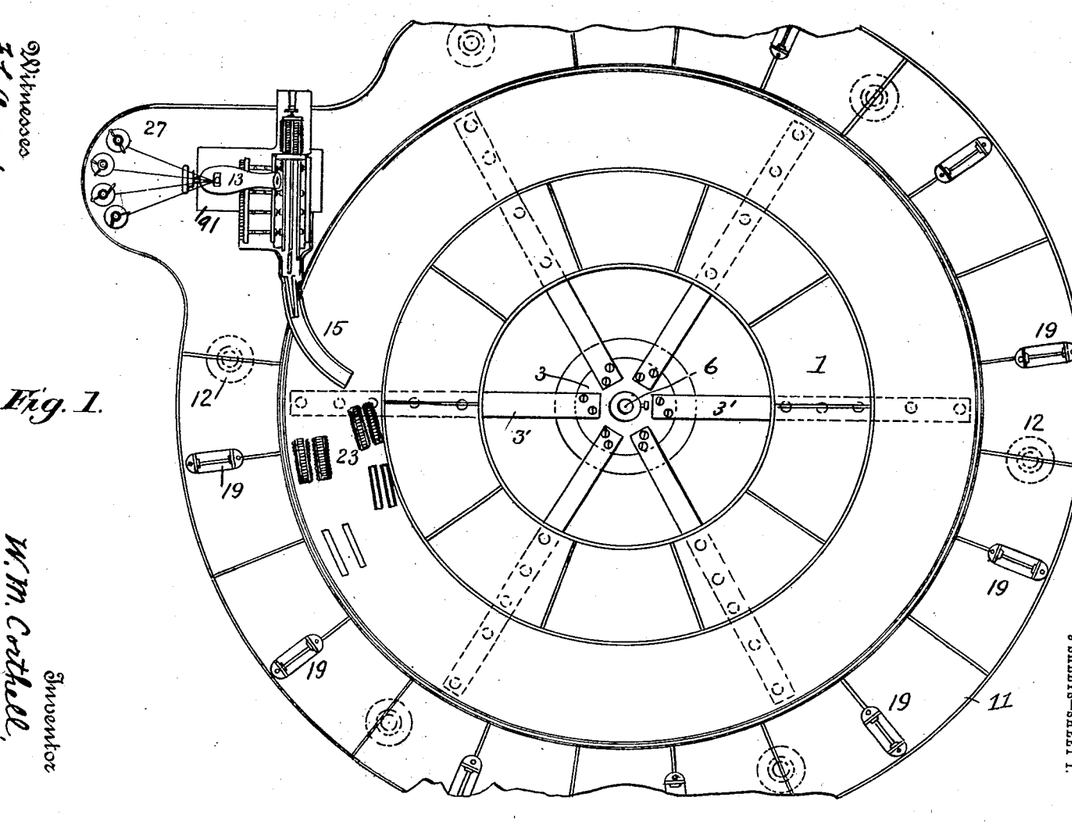
—Figure 1 is a plan of the entire machine comprising a rotary holder-carrier, a sewing machine partly broken away, and devices for feeding the holders under the sewing machine needles.
Figure 2:
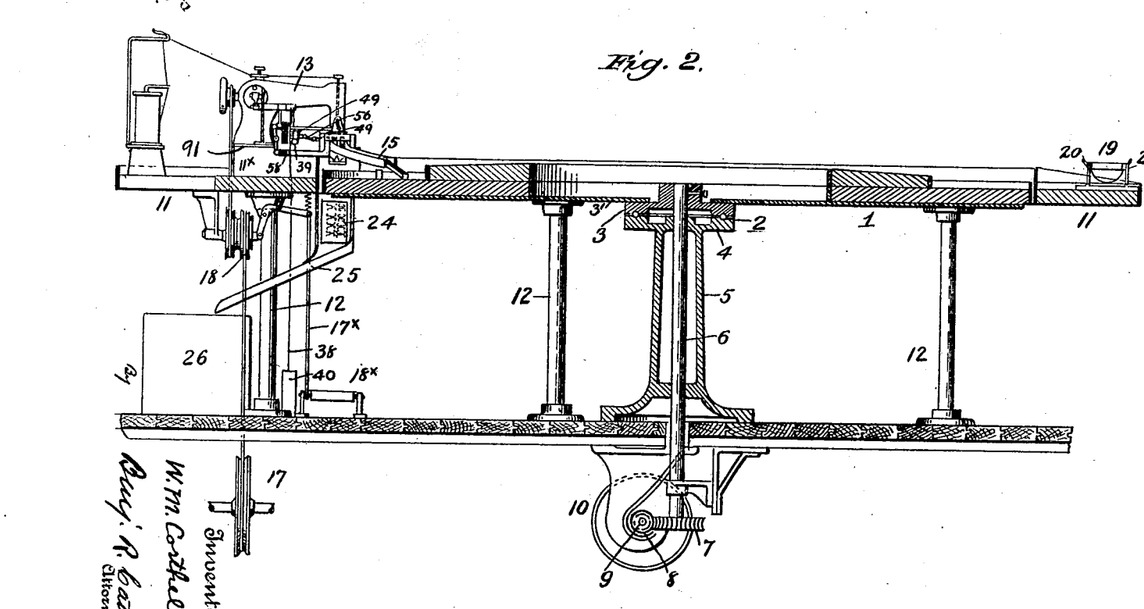
Fig. 2 is a central vertical section of the same.
Figures 9, 10, 11, 12, 13:
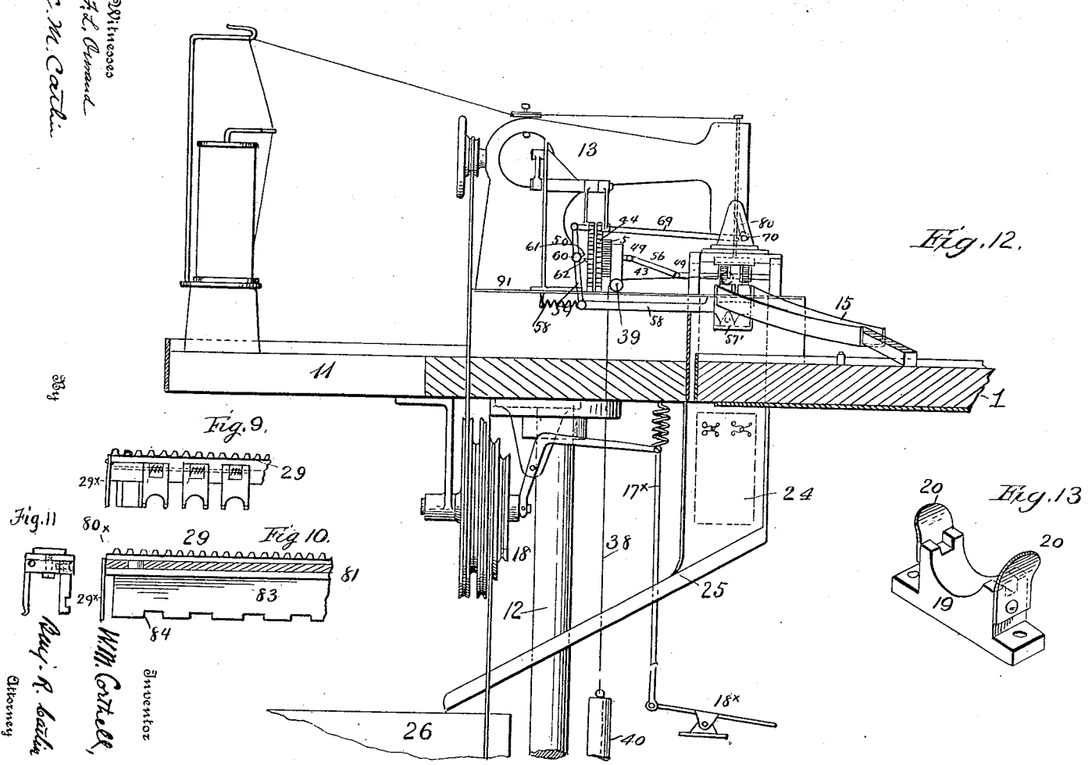
Fig. 9 is an elevation of a hook and eye holder partly broken away.
Fig. 10 is a longitudinal section of the same.
Fig. 11 is an end view of the holder.
Fig. 12 is an enlarged view partly in section of the sewing machine and adjacent parts.
Fig. 13 is a perspective of a support for a holder while being filled with hooks and eyes.
Figure 14:
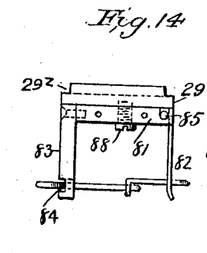
Fig. 14 is an end elevation of a holder with a card-moving plate removed, showing a hook engaged with an eye and supported therein.

19, Figs. 1, 2, 13, denote devices for supporting the holders 80$^x$ while being filled with hooks and eyes by operatives arranged around the bench.

20 are holder-retaining springs.

Holders to be filled are indicated in Figs. 1 and 9 to 11 and Figs. 14 to 18.

A filled card is denoted by 24 (see Fig. 2) and 25 is a card chute leading to a receptacle 26.

Figure 3:
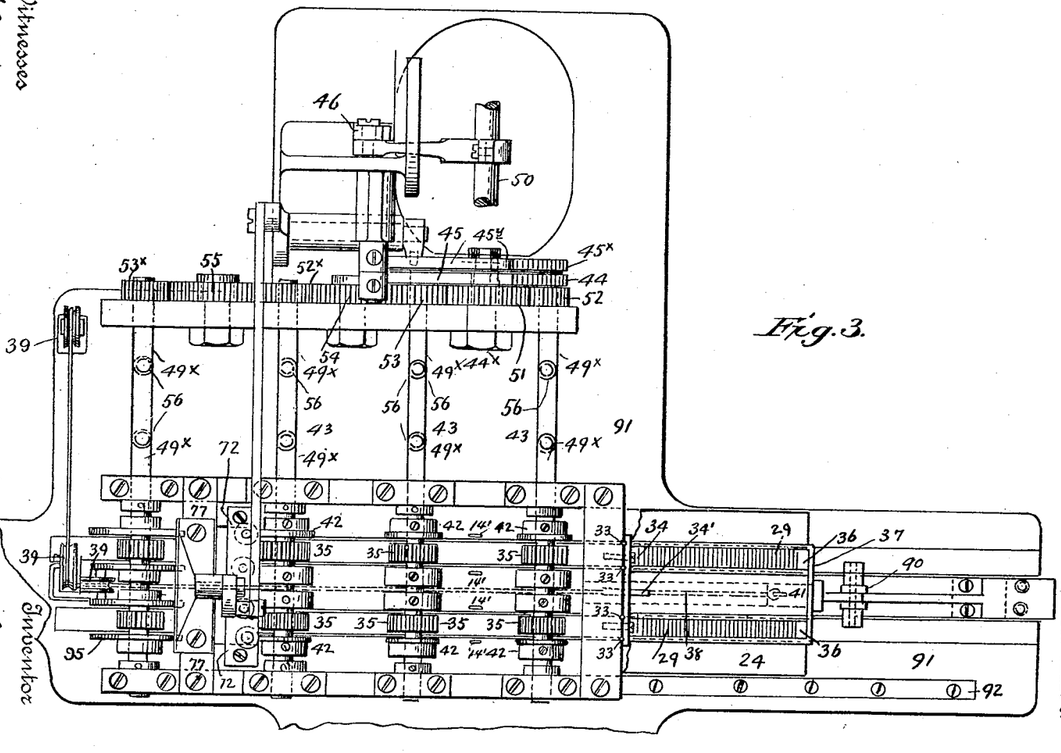
Fig. 3 is a broken plan of the holder feeding mechanism.

27 denotes an enlargement of the approximately annular bench 11 to support the sewing machine and connected parts. An operator at 27 places holders previously filled with hooks and eyes upon empty cards 24 which have been placed on the bed plate 91 and against a strip or ledge 92 (see Figs. 3 and 4).

Figure 6:
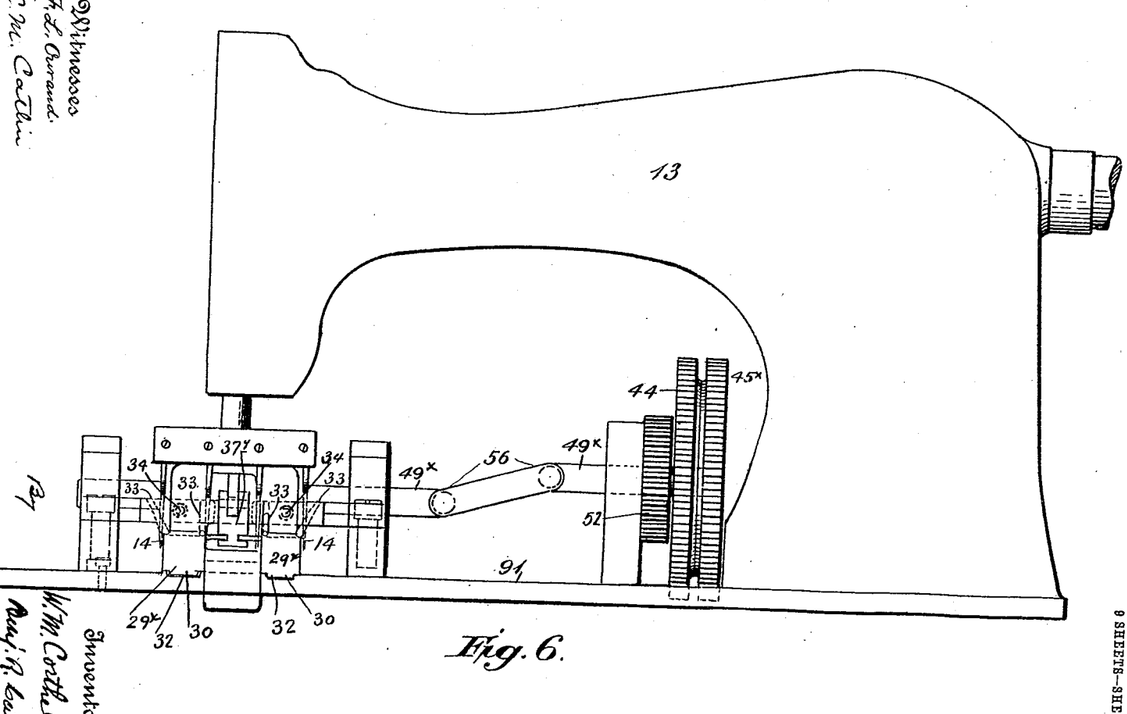
Fig. 6 is a front elevation showing a holder-driving pinion, ratchet wheels, springs bearing on the holders, needles and connected parts.
Figure 15:
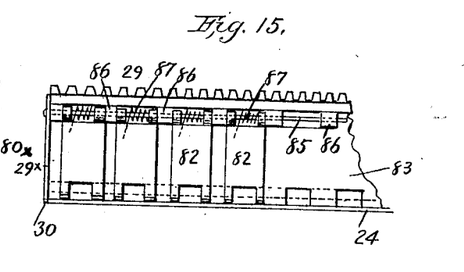
Fig. 15 is a partial side elevation of the holder.
Figure 16:
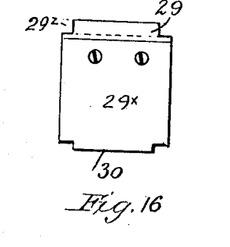
Fig. 16 is an elevation and Fig. 17 a vertical section of a card-moving plate fixed to the end of the holder.
Figure 17:
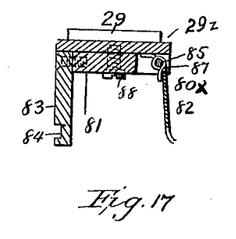
Figure 18:
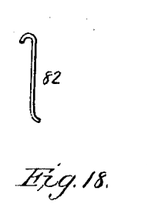
Fig. 18 is an edge view of a movable plate forming part of the holder.
Figure 19:
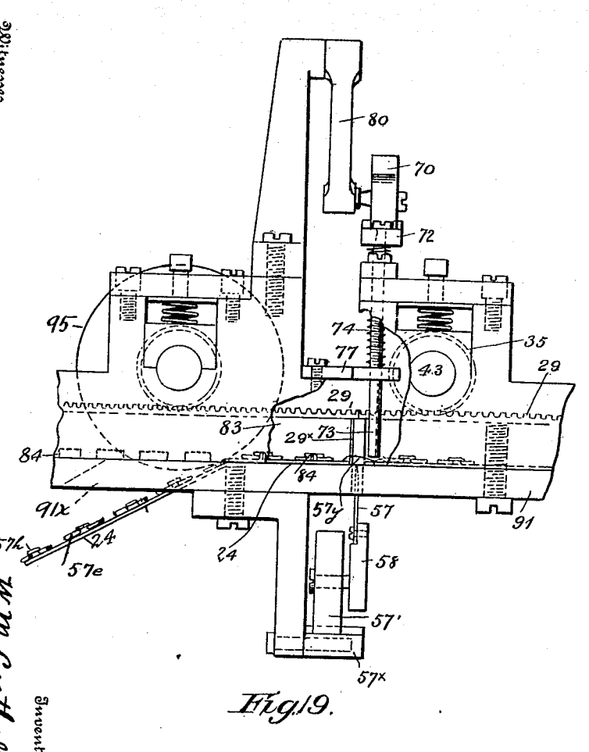
Fig. 19 is a partial enlarged elevation partly broken away of the delivery end of the machine, showing the thread holding and thread cutting mechanism.
Figure 20:
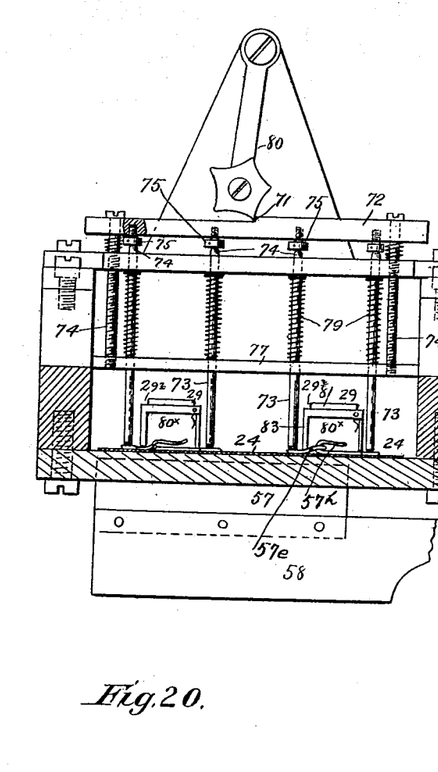
Fig. 20 is a partial enlarged elevation of the delivery end of the machine, the view being opposite to that of Fig. 5.

29$^x$, Figs. 6, 15, 16, is a plate fixed, one to each holder and provided with a lip 30 extending into a groove 32 in the bed plate. This lip engages the rear edge of a card resting upon the bed plate and draws it along the plate over the needle holes 14′, Fig. 3, and to the discharge end of the machine when the holders are suitably moved.

33 indicates spring wires or fingers adapted to press down the holders upon the card. The lower ends of the springs bear on the tops of the holders at either side of the rack teeth, as at 29$^z$, see Figs. 14, 16 and 17. These springs are suitably held in spring clamping blocks secured by screws 34. They operate to insure the engagement of the holder racks 29 with holder-driving pinions 35 when said holders are entered by an operative under ledges 36 and then moved by the follower under springs 33. The holders are in the present instance introduced in pairs and their ends are after suitable manipulation of co-acting parts situated each under ledges 36 of a holder-feeder or follower 37, which is pivoted to a follower-carrier or support 90. The ledges keep the holder upon the card and insure the engagement with it of lip 30. In the absence of separate means for pressing the holder down upon the card the pressure of the holder-driving-pinions on its front end would cause its rear end to rise and thereby disengage lip 30 from the card. The proper operation of this lip or some equivalent is necessary to accurate work, and for the best results the card-moving lip extends into the groove 32. Neither the particular form nor dimensions of the lip is essential to the movement of the card by means of the holder. The follower with devices to operate it is an important means of insuring simultaneous engagement of the holder-racks with the pinions. To further insure uniformity of movement of the follower and to prevent its striking the springs 33 it is stopped by a post 34′. The holder is drawn under a holder-driving gear 35 by a cord 38 running over pulleys 39 to a weight 40. This cord is attached to the follower-carrier at 41.

The holders are positively moved through the machine by the pinions 35 engaging racks 29, being guided by sleeved disks 42 fixed on shafts 43 comprising flexibly connected sections 49$^x$ that carry the holder-driving pinions 35. Said shafts are supported in bearings above the bed plate and are driven mediately by a ratchet wheel 44, actuated by a driving pawl 45 loosely held by an arm 46′ of a lever or bar 46 journaled on a stud 46$^x$ by means of a sleeve 47. Said bar has an arm loosely connected to the arm of an eccentric strap 48 on eccentric 49 on the main driving shaft 50. In operation the eccentric rocks the lever 46 which actuates the driving pawl 45.

Figures 4, 7, 8, 8X:
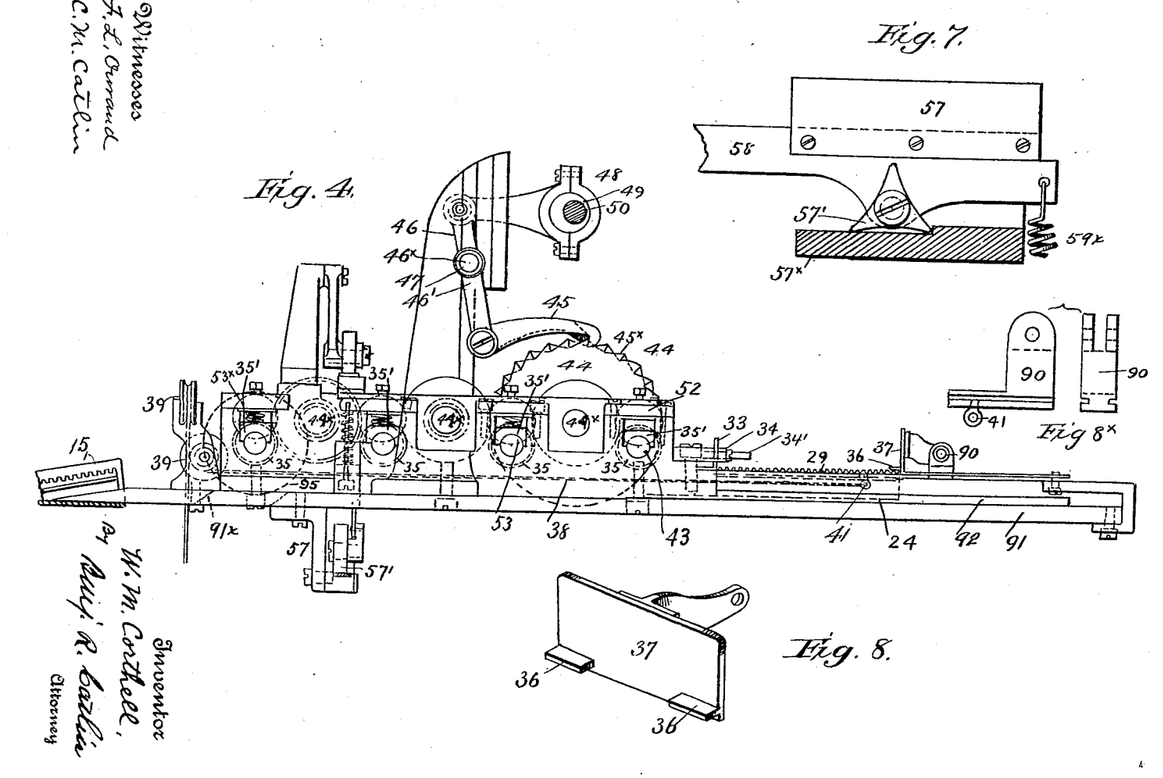

45$^x$ is a circular rack loosely supported on stud or shaft 44$^x$ and actuated by a pawl 45$^y$ moved by a lever 46 until a cam or projection 62 on said rack engages a projection 61 on a pivoted lever or bar 59 with the effect to actuate a thread-cutting knife that separates or frees a filled card or the last of a group of such cards. The ratchet 44 being moved as set forth, drives, through the medium of a gear 51 fixed thereto gears 52 and 53 on the flexible shafts 43 that have each a holder moving pinion 35. The gear 51, ratchets 44 and 45$^x$ are loosely supported on a short shaft or stud 44$^x$, said gear 51 being fixed to the ratchet 44 and geared with pinions 52 one on each side fixed on a flexible shaft 43. As indicated in Fig. 4 the gears or pinions 52 are situated higher than pinions 35 as inferable from the showing of the shaft in Fig. 5.

52$^x$ and 53$^x$ are gears for transmitting power to remote shafts 43, suitable intermediate gears on studs being indicated by 54 and 55.

35′ denotes spring pressed bearing blocks at the ends of shafts 43, which shafts comprise sections 49$^x$ connected by ball and socket joints 56. By means of these or equivalent driving shafts the axes of parallel pinions and gears may be situated in different planes. Thus the comparatively small pinions 35 are driven by means of gears of larger diameter, all being situated above a bed plate 91 of the machine, and the pinions are driven from the larger ratchet wheel all being situated above the needle plate of the sewing machine without the additional intermediate gears which would otherwise be required. It is thus also provided that the shafts may move slightly in radial direction to compensate for small variations in the dimensions of the hook and eye holders. This avoids the liability of disengagement between the holders and their driving pinions which might otherwise occur and particularly in case the holders or cards vary in thickness.

A further advantage of shaft 43 is that it enables a larger gear 51 and larger ratchets 44 and 45$^x$ to be used above the bed plate and facilitates the situation of the driving pawl 45 above its ratchet wheel and in more direct connection with the main shaft 50 whereby sufficient power is attained, which cannot be secured by the medium of the feed shaft of the machine which has other duties to perform.

Figure 5:
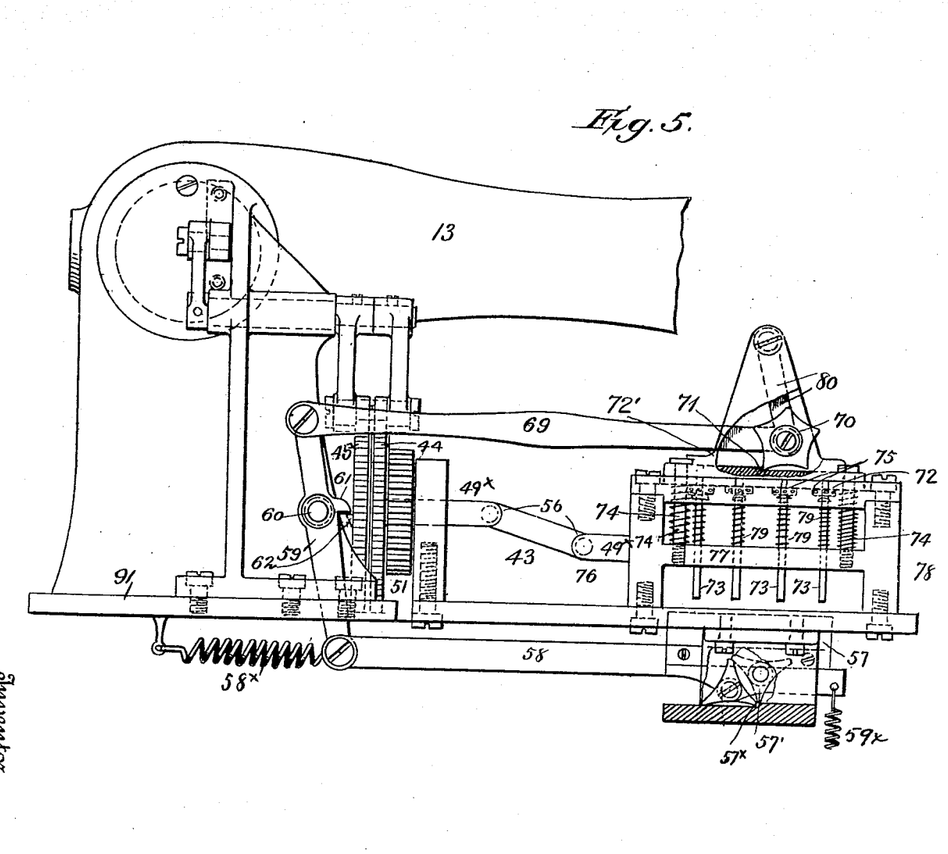
Fig. 5 is a partial rear elevation showing a thread cutter and thread holders.

The filled holders and cards being moved under the needles and the machine operated to attach the hooks 57$^h$ and eyes 57$^e$ to the cards by continuous threads, these threads 57$^y$ are cut between the last of the successive pairs of cards by a knife 57 situated adjacent and on the delivery side of certain thread-holding plungers to be described and actuated by the rod or knife handle 58 pivotally connected to a lever 59 having a fulcrum at 60 and provided with the tappet 61 in the path of the cam 62 fixed on ratchet wheel 45$^x$. To the cutter or knife carrying arm 58 (see Figs. 5 and 7) is pivotally connected an angular piece or trip 57' which bears on a plate 57$^x$, fixed by a pendent bracket to base plate 91, and against a shoulder thereon, and throws the cutter upwards when it is moved lengthwise by the arm 58 thereby cutting the threads with greater speed and certainty, and at the same time adding to the tension of the spring 59$^x$ whereby it retracts the cutter more quickly. In Fig. 5 the position assumed by the rotating angular piece 57' when the movement of the knife handle has begun is indicated by broken lines. Its complete movement turns said piece down on the plate. A knife-bar-returning spring is denoted by 58$^x$.

It is important to successful operation that the trip 57' be triangular in form or have an initial or normal angular bearing such as results from the form illustrated. The other end of lever 59 is connected by a rod 69 to a swinging angular piece or trip 70 adapted to engage a shoulder 71 on a bar 72 and be turned thereby. The purpose of this device is to depress bar or plate 72 and spring supported plungers 73 to press the threads upon the card at the last needle holes. This operation is simultaneous with the cutting of the threads between the last card and its predecessor and serves to hold the thread while being cut. This trip or piece 70 is made pentagonal in form substantially as represented to insure proper engagement of its angles immediately upon the shouldered plate 72 at an efficiently operative angle.

74 denotes screw connections with returning spring which movably support the bar or plate 72. Said screws take into the cross bar 77 extended laterally for the purpose. 79 are plunger-returning springs which hold the heads 74$^x$ of the plungers in contact with screws 75 adjustably held in bar 72, which bar, as before indicated, is loosely connected to the cross bar 77 of the frame fixed by screws to the sewing machine base 91. The springs on screws 74 return bar 72 and springs 79 cause the plungers to follow when said bar is released from the swinging piece 70. The latter is partially rotated at each operation being suitably connected to a pivoted swinging arm 80 and with such degree of friction that it will not overrun when partially rotated as stated.

One advantage of using a trip (70) having five or more sides is that the sides are shorter in relation to the distance from the center, than in a trip of rectangular form, as heretofore proposed. The result is that the trip is more easily operated, hence its lower side may rest flat down on the plate on which it acts.

Operatives stationed about the annular bench supplied with hook and eyes take holders from the rotating table and placing them in the holder supports 19 fill them with the hooks and eyes and then deposit them on the rotating table by which they are carried to the vicinity of the sewing machine, whereupon an operator places a card and holder upon the ways behind the follower-carrier and draws said carrier back over the holder thus bringing the lip 36 above the rear end of the holder, whereupon the carrier, follower, holder and card are advanced by the weight and the cord, and the loops of the hooks and eyes brought under the needles and said hooks and eyes sewed upon said card.

Each holder with its card having hooks and eyes sewed thereon is finally moved by the last gear 35 before or after the thread has been cut as specified, under a sleeve or sleeved disk 95 which presses the card with its attached hooks and eyes away from the holder and delivers the card to the opening 91$^x$ leading to chute 25 situated respectively in the bed plate 91 and below the bench 11, the holder being dropped into the chute 15 to be deposited on the rotating table and the card falling into the chute 25.

Having described the invention what I claim is,—

1. In a machine for attaching hooks and eyes to cards, a sewing mechanism comprising a needle and a needle plate having a needle hole, a holder for hooks and eyes, spring fingers adapted to press the holder upon the plate, and means comprising a driving pinion or wheel adapted to engage and drive the holder and a card therewith across the plate under said needle, said springs engaging the holder in advance of said driving wheel.

2. In a machine for attaching hooks and eyes to cards, the combination of a sewing mechanism comprising a plurality of needles, and a needle plate having needle holes, a holder for both hooks and eyes, means for moving the holder and card therewith across the plate and under said needles, comprising a driving pinion or wheel adapted to engage the holder to drive it, and a spring finger pressing the holder on the plate in advance of said driving wheel.

3. In a machine for attaching hooks and eyes to cards, a sewing mechanism comprising a needle and needle plate, a holder for hooks and eyes, a rack on said holder, driving pinions engaging said rack, and means comprising a follower behind the holder, and a weight operatively connected to the follower and mediately to the holder for moving it into engagement with the first of said pinions.

4. In a machine for attaching hooks and eyes to cards, a sewing mechanism, a holder for hooks and eyes, and means for moving the holder toward the sewing mechanism comprising a follower at the rear of the holder, a carrier to which the follower is pivotally connected, and a weight connected to said carrier.

5. In a machine for attaching hooks and eyes to a card, a sewing mechanism comprising a needle plate, a holder for hooks and eyes, a follower, a weight, and a connection between the weight and follower whereby the latter may be moved to move the holder and card, said follower having a part bearing on the holder to keep it upon the plate.

6. In a machine for attaching hooks and eyes, a sewing mechanism comprising needles and a bed plate, devices for carrying hooks and eyes and bodies to which they are to be attached across said plate, means operated by the sewing mechanism for moving said devices to bring successive hooks and eyes under the needles, a cutting device extending transversely of the sewing threads, and means operated at predetermined times to cut the threads and comprising a triangular pivoted trip device.

7. A holder having members to receive hooks and eyes and adapted to be moved by mechanism, said holder comprising a back and a plurality of hook-supporting plates pivoted to the holder back, a single pivot pin for several hook-supporting plates, and a plurality of coiled springs each having one end bearing on its plate and the other bearing on the back, whereby the assembling of the plates, spring and holder back puts the springs under tension to hold hooks engaged with eyes said hooks and eyes being supported respectively in said members.

8. In a holder for hooks and eyes, the holder back having a series of bearings, the continuous rod fitting in said several bearings, the hook-holding plates with curved parts to embrace said rod, and the coiled springs one end of each of which bears against one of said hook-holding plates, the other end thereof bearing against a suitably situated fixed abutment, whereby the springs are put under tension and supported when the parts are assembled.

9. In a machine for attaching hooks and eyes to cards, the combination of a sewing mechanism, a hook and eye holder, a follower separate from the holder but engaging the rear end thereof, a follower - carrier, and means for moving the carrier, thereby mediately moving the holder and its hooks and eyes toward needles comprised in said sewing mechanism, said follower and follower-carrier moving together horizontally and the follower being adapted to move up and down independently.

10. In a machine for attaching hooks and eyes to cards, the combination of a sewing mechanism comprising needles, a hook and eye holder, a follower engaging the rear end of the holder, a follower-carrier, means for moving the carrier to move the hooks and eyes held by the holder toward the sewing needles, and a stop for the follower in advance of the needles.

11. The combination of a sewing mechanism comprising a needle and a needle plate, means for moving a card along on said plate and under the needle, a hook-and-eye holder for moving hooks and eyes along said plate and over said card, and a device extending below the surface of said plate and adapted to press the card and attached hooks and eyes below said surface thus separating them from the holder.

12. The combination of a sewing mechanism comprising a needle and a needle plate, means for moving a card on said plate and under the needle, a hook-and-eye holder for moving hooks and eyes along said plate and over said card and under the needle whereby the card and hooks and eyes are connected, a rotary disk beyond the needle and extending below the surface on which the card moves and adapted to press the card with hooks and eyes below said surface, there being an opening through the plate for passage of said cards.

13. In a machine for attaching hooks and eyes, the combination with a holder-driving wheel, of a holder for hooks and eyes, a separate follower bearing on the rear of the holder and also on its top and operable to move it under said holder driving wheel.

14. In a machine for attaching hooks and eyes to cards, a holder for hooks and eyes, a follower contiguous but separate from the holder and operating against the holder, mechanism for moving the follower, said follower bearing on the rear end of the holder, and said holder adapted to bear on the rear edge of a card resting freely on a bed plate, and said bed plate having a groove in its upper surface to receive a card moving part of the holder.

15. The combination of a sewing mechanism comprising a bed plate and a main driving shaft above the bed plate, a hook and eye holder, a holder driving pinion, a ratchet wheel mediately driving the pinion, a driving pawl operating on the side of said ratchet wheel adjacent the said main shaft, and connections intermediate the pawl and shaft whereby said pawl is directly driven from said main shaft.

16. The combination of a sewing mechanism comprising a bed plate and a main shaft above the bed plate, a hook and eye holder, a holder-driving pinion, a ratchet wheel mediately driving the pinion, and connections whereby the ratchet wheel is driven from the main shaft of the sewing mechanism, said connections being all above the bed plate and comprising a driving pawl engaging the ratchet wheel above the bed plate, a reciprocating lever, an eccentric, an eccentric strap, and means operatively joining said strap and lever, said eccentric being on said main shaft.

In testimony whereof, I have signed this specification in the presence of two subscribing witnesses.

WILLIAM M. CORTHELL.

Witnesses:
E. ELMO CLARK,
C. M. CATLIN.